(12) United States Patent
Bicker

(10) Patent No.: US 8,525,013 B2
(45) Date of Patent: Sep. 3, 2013

(54) VOIP MUSIC CONFERENCING SYSTEM

(75) Inventor: Dennis Dale Bicker, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1220 days.

(21) Appl. No.: 12/395,775

(22) Filed: Mar. 2, 2009

(65) Prior Publication Data

US 2009/0161585 A1    Jun. 25, 2009

Related U.S. Application Data

(63) Continuation of application No. 11/153,853, filed on Jun. 15, 2005, now Pat. No. 7,511,215.

(51) Int. Cl.
*G10H 7/00* (2006.01)

(52) U.S. Cl.
USPC ............ 84/645; 84/610; 84/625; 84/634; 84/650; 84/660; 84/666

(58) Field of Classification Search
None
See application file for complete search history.

(56) References Cited

U.S. PATENT DOCUMENTS

| | | | |
|---|---|---|---|
| 6,801,521 B1 | 10/2004 | Shaffer et al. | |
| 7,020,635 B2 | 3/2006 | Hamilton et al. | |
| 7,030,311 B2 | 4/2006 | Brinkman et al. | |
| 7,297,858 B2 * | 11/2007 | Paepcke | 84/609 |
| 7,511,215 B2 * | 3/2009 | Bicker | 84/645 |
| 7,672,296 B2 * | 3/2010 | Aoyagi et al. | 370/352 |
| 2004/0151212 A1 | 8/2004 | Gerszberg et al. | |
| 2005/0027888 A1 | 2/2005 | Juszkiewicz | |
| 2005/0117569 A1 * | 6/2005 | Aoyagi et al. | 370/352 |
| 2005/0120866 A1 * | 6/2005 | Brinkman et al. | 84/609 |
| 2006/0283310 A1 * | 12/2006 | Bicker | 84/645 |
| 2007/0006255 A1 | 1/2007 | Cain | |
| 2008/0120311 A1 * | 5/2008 | Reed et al. | 707/100 |
| 2009/0161585 A1 * | 6/2009 | Bicker | 370/260 |

OTHER PUBLICATIONS

Non-Final Office Action for U.S. Appl. No. 11/153,853 mailed Apr. 10, 2007, 10 pages.
Final Office Action for U.S. Appl. No. 11/153,853 mailed Sep. 24, 2007, 6 pages.
Notice of Allowance for U.S. Appl. No. 11/153,853 mailed Nov. 19, 2008, 10 pages.

* cited by examiner

*Primary Examiner* — Marlon Fletcher
(74) *Attorney, Agent, or Firm* — Toler Law Group, PC

(57) ABSTRACT

A system is disclosed and includes a network interface to receive a first Internet Protocol (IP) message within a first Voice over Internet Protocol (VoIP) call over a network, where the first IP message carries a first Musical Instrument Digital Interface (MIDI) signal. The system also includes a processor to receive the first IP message from the network interface and to extract the first MIDI signal from the first IP message.

20 Claims, 1 Drawing Sheet

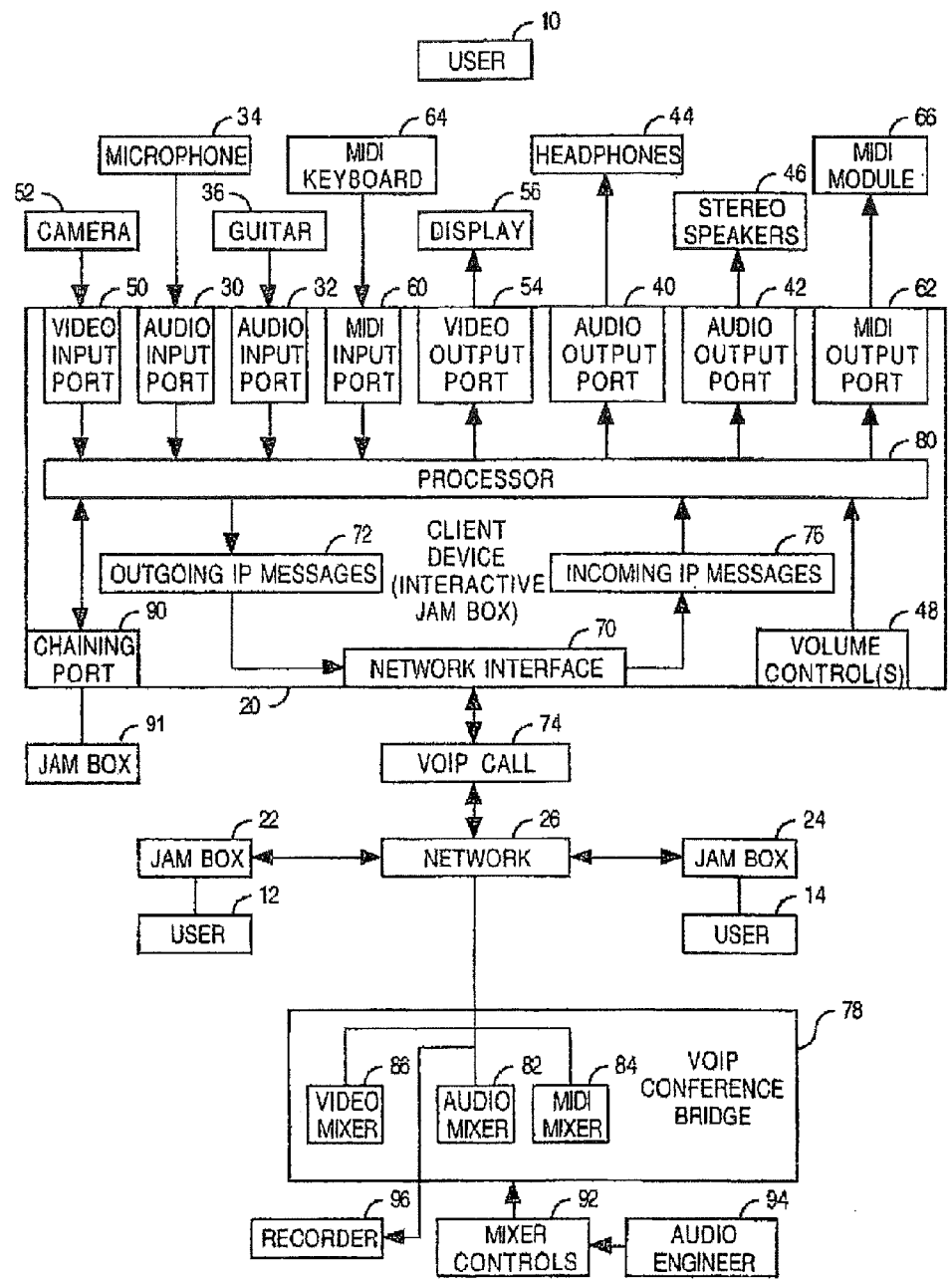

VOIP MUSIC CONFERENCING SYSTEM

CLAIM OF PRIORITY

The present application claims priority from and is a continuation of patent application Ser. No. 11/153,853 filed on Jun. 15, 2005 and entitled "VOIP Music Conferencing System," the contents of which are expressly incorporated herein by reference in their entirety.

FIELD OF THE DISCLOSURE

The present disclosure relates to systems for remotely-located musicians to perform together.

BACKGROUND

Groups of musicians who wish to perform together typically assemble in a common location such as a performance venue, a rehearsal studio, a recording studio or a person's home. At times, it is a challenge to assemble all of the members of a music group at the same place and time in order to perform together.

BRIEF DESCRIPTION OF THE DRAWINGS

FIG. 1 is a block diagram of an embodiment of a VoIP music conferencing system.

DETAILED DESCRIPTION

Disclosed herein are embodiments of a Voice over Internet Protocol (VoIP) music conferencing system that enables physically-distant musicians to see and hear each other in a group performance, and enables an audio engineer to mix and/or record the audio of the group performance at a VoIP phone bridge.

In a particular embodiment, a system is disclosed and includes a network interface to receive a first Internet Protocol (IP) message within a first Voice over Internet Protocol (VoIP) call over a network, where the first IP message carries a first Musical Instrument Digital Interface (MIDI) signal. The system also includes a processor to receive the first IP message from the network interface and to extract the first MIDI signal from the first IP message.

In a particular embodiment, a system is disclosed and includes a Musical Instrument Digital Interface (MIDI) mixer to generate a mixed MIDI signal that includes a first MIDI signal and a second MIDI signal. The system also includes a Voice over Internet Protocol (VoIP) conference bridge to receive the mixed MIDI signal from the MIDI mixer, and to generate a first Internet Protocol (IP) message to carry the mixed MIDI signal. The VoIP conference bridge is also to communicate the first IP message carrying the mixed MIDI signal within a first VoIP call over a network.

In a particular embodiment, a computer-readable medium is disclosed. The computer-readable medium stores processor-executable instructions that, when executed, cause the processor to extract a Musical Instrument Digital Interface (MIDI) signal carried by an incoming Internet Protocol (IP) message within a Voice over Internet Protocol (VoIP) call over a network.

FIG. 1 is a block diagram of an embodiment of a VoIP music conferencing system. For purposes of illustration and example, FIG. 1 shows the VoIP music conferencing system being used to enable three users 10, 12 and 14 at three different locations to perform music together. In general, the VoIP music conferencing system can be used to enable more or less than three different users at more or less than three different locations to perform music together.

The VoIP music conferencing system comprises client devices 20, 22 and 24 for the users 10, 12 and 14, respectively. Each of the client devices 20, 22 and 24 may be referred to as an "interactive jam box" because they allow the users 10, 12 and 14 to interactively perform music together (or "jam") via a network 26. Each of the client devices 20, 22 and 24 may be embodied by a general purpose computer, a set-top box, a VoIP telephone, or a peripheral of any of these. Examples of the network 26 include Internet Protocol (IP) networks such as an IP Television (IP TV) network, a VoIP network, the Internet, an intranet or an extranet.

The client device 20 comprises multiple audio input ports 30 and 32 to receive audio signals generated by the user 10. The audio input ports 30 and 32 provide connections to receive audio signals from external devices such as a microphone 34, an instrument having a microphone-level output such as a guitar 36, and an audio playback device (not illustrated) which may have either a microphone-level or a line-level output such as a CD player, a tape player, a DVD player, an MP3 player or another digital audio player. The microphone 34 may be used to capture vocals produced by the user 10 and/or to capture sound produced by acoustic instrument(s) played by the user 10. The audio input ports 30 and 32 may include RCA input jacks, ⅛ inch or ¼ inch jacks (either mono or stereo), or any combination thereof, for example. In general, the client device 20 may comprise more than the two audio input ports shown in FIG. 1.

The client device 20 further comprises multiple audio output ports 40 and 42. The audio output ports 40 and 42 provide connections to output audio signals to external devices such as headphones 44, stereo speakers 46, and an audio recording device (not illustrated) such as a tape recorder, a CD recorder, a DVD recorder, an MP3 recorder or another digital audio recorder. The audio output ports 40 and 42 may include RCA output jacks, ⅛ inch or ¼ inch jacks (either mono or stereo), or any combination thereof. In general, the client device 20 may comprise more than the two audio output ports shown in FIG. 1. One or more volume controls 48 enable the user 10 to control the volume of audio signals applied to the multiple audio output ports 40 and 42.

The client device 20 further comprises a video input port 50. The video input port 50 provides an input connection to receive video signals from an external video-generating device such as a video camera 52. The video camera 52 may capture moving images of the user 10 during his/her performance. The video input port 50 may comprise either a Universal Serial Bus (USB) port or an RCA jack, for example. In general, the client device 20 may comprise more than the one video input port shown in FIG. 1.

The client device 20 further comprises a video output port 54. The video output port 54 provides an output connection to output video signals to an external video display device 56. The video output port 54 may comprise a video monitor port, an RCA jack, or a coaxial cable jack, for example. The video display device 56 may comprise a computer monitor or a television, for example.

The client device 20 further comprises a Musical Instrument Digital Interface (MIDI) input port 60 and a MIDI output port 62. The MIDI input port 60 provides an input connection to receive MIDI signals from an external device such as a MIDI keyboard 64 or an alternative MIDI controller (e.g. a MIDI sequencer, a pitch-to-MIDI device, one or more MIDI percussion pads, a MIDI drum machine, MIDI pedals or a MIDI wind instrument). The MIDI output port 62 provides an output connection to output MIDI signals to an external device such as a MIDI sound module 66 or a MIDI recorder (not illustrated). The MIDI sound module 66 outputs synthesized or sampled audio based on the MIDI signals outputted from the MIDI output port 62. The MIDI recorder (not illustrated) records the MIDI signals outputted from the MIDI output port 62 into a MIDI song file.

The client device 20 comprises a network interface 70. The network interface 70 enables the client device 20 to be connected to the network 26. The network interface 70 sends outgoing IP messages 72 within a VoIP call 74 via the network 26. The network interface 70 further receives incoming IP messages 76 within the VoIP call 74 via the network 26. The VoIP call 74 is made to a VoIP conference bridge 78 having a connection to the network 26. The VoIP conference bridge 78 can accept multiple simultaneous VoIP calls, including the VoIP call 74, and can bridge the client devices 20, 22 and 24 of the users 10, 12 and 14 via the multiple simultaneous VoIP calls. The VoIP conference bridge 78 can either automatically assign ports to inbound VoIP calls, or allow each caller to request a port number by keying the number, or assign ports based on a caller's telephone number.

A VoIP processor 80 generates the outgoing IP messages 72 to carry any combination of at least one audio input signal received from the audio input ports 30 and 32, a first MIDI signal received from the MIDI input port 60 and a first video signal received from the video input port 50. From the incoming IP messages 76, the VoIP processor 80 extracts any combination of a second MIDI signal to apply to the MIDI output port 62, a second video signal to apply to the video output port 54, and at least one audio output signal to apply to the audio output port(s) 40 and/or 42.

The audio input ports 30 and 32 and the VoIP processor 80 can support, with one associated dialing sequence, multiple simultaneous VoIP channels that are independently mixable. The multiple audio output ports 40 and 42 can support multiple simultaneous VoIP channels that were independently mixed.

The client devices 22 and 24 have substantially the same components and/or functionality as the client device 20 to process music performances of the users 12 and 14 and generate outgoing IP messages based thereon, and to receive incoming IP messages and generate outputs based thereon that enable interaction with other users. The VoIP conference bridge 78 receives the outgoing IP messages generated by the client devices 20, 22 and 24.

In one embodiment, the VoIP conference bridge 78 includes an audio mixer 82, a MIDI mixer 84 and a video mixer 86. The audio mixer 82 mixes the audio input signals carried by the outgoing IP messages generated by the client devices 20, 22 and 24, to generate a mixed audio signal. The video mixer 86 mixes the video input signals carried by the outgoing IP messages generated by the client devices 20, 22 and 24 to generate a mixed video signal. The MIDI mixer mixes the MIDI input signals carried by the outgoing IP messages generated by the client devices 20, 22 and 24 to generate a mixed MIDI signal. The VoIP conference bridge 78 generates IP messages to carry the mixed audio signal, the mixed video signal and the mixed MIDI signal. The IP messages are communicated via the network 26 and become the incoming IP messages to the client devices 20, 22 and 24. This enables the mixed audio signal to be heard using the headphones 44 and/or the stereo speakers 46, the mixed MIDI signal to be played using the MIDI sound module 66, and the mixed video signal to be displayed by the display device 56.

The client device 20 optionally comprises a through-network chaining port 90. The chaining port 90 enables the client device 20 to be chained to another client device 91. The client device 91 may have substantially the same components and/or functionality as the client device 20. Using the chaining port 90, a chain of two or more client devices can be formed to expand the number of input and output ports supported at a particular location.

In practice, any of the users 10, 12 and 14 can plug any combination of his/her headphones, a microphone, an instrument's microphone output, and a MIDI device, for example, into his/her client device. Each user uses his/her client device to call into a VoIP conference. After joining the VoIP conference, each user can jam with other users on the call. Each of the users 10, 12 and 14 can hear a mix of audio simultaneously performed by the users 10, 12 and 14. Optionally, the mix of performance audio can be outputted through an amplifier and speakers for a larger audience. As another option, a user can make an audio recording of the session via an audio output port of his/her client device. With the video camera 52 and the display 56, the user 10 can see and be seen by other performers on the call. This enables visual cues to be communicated between performers during a performance. Visual cues are important during improvisational performances, large-scale performances (e.g. by a symphony), rehearsals and musical instruction (e.g. by a music teacher). Optionally, the video mixer 86 can mix multiple video signals so that a conductor is shown in the middle of the display 56 surrounded by pictures of group members. The conductor may be displayed larger than each of the group members. The MIDI input and output enable the user to capture MIDI files to be edited and played back later.

The VoIP music conferencing system enables a music teacher to remotely give lessons to a student at potentially any location on Earth. Small or large bands can have jam sessions at any time of day or night with minimal disturbance to those around them and without needing to physically congregate. Choirs, quartets and symphony orchestras can practice and perform in a virtual hall. The size of the group may be limited only by the capacity of the conference bridge 78. Potentially, thousands of members can perform together, which is a larger number than previously practical. The system makes it easier to create a "We are the World"-type concert or recording.

Optionally, the VoIP conference bridge 78 includes mixer controls 92 to enable an audio engineer 94 or another person to independently control mixing levels of each of the audio signals inputted to the audio mixer 82. This allows the audio engineer 94 to control the mixed audio signal being distributed to the users 10, 12 and 14. The audio mixer 82 and/or the mixer controls 92 may be either integrated with the conference bridge 78 or externally connected to the conference bridge 78. The VoIP conference bridge 78 with a user-controlled mixing capability may be referred to as an "interactive mix box."

A recorder 96 can record, to a digital or an analog medium, some or all of the separate channels of audio (and/or the mixed audio). For a digital medium, the recorded data can be made available via a digital interface such as a USB interface or a FireWire interface. The recorder 96 can comprise a multi-track audio recorder to record each respective audio signal received in the plurality of simultaneous VoIP calls on a separate track. Along with the separate channels of audio, the recorder 96 can record separate channels of MIDI and/or separate channels of video. The recordings of the separate channels can be later re-mixed by the audio engineer 94 or another person.

In combination with the client devices 20, 22 and 24, the VoIP conference bridge 78 enables audio engineers to create a mix with appropriate sound levels for a virtual musical group such as a vocalist/accompanist duo, a small band, a large band, a quartet, a choir or an orchestra. When fixed ports and input levels are used, preset audio levels on the audio mixer 82 can simplify the job of the audio engineer 94.

Acts performed by the VoIP processor 80 can be performed by one or more computer processors directed by computer-readable program code stored by a computer-readable medium.

Each of the client devices 20, 22 and 24 can be either integrated with or a peripheral of a set-top box for an IP television service. Alternatively, each of the client devices 20, 22 and 24 can be either integrated with or a peripheral of a VoIP telephone for a VoIP telephone service. As another alternative, each of the client devices 20, 22 and 24 can be either integrated with or a peripheral of a general purpose computer used in an Internet service.

It will be apparent to those skilled in the art that the disclosed embodiments may be modified in numerous ways and may assume many embodiments other than the particular forms specifically set out and described herein. The above disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
 a network interface of a first device, the network interface configured to:
  send an outgoing internet protocol message to a conference bridge, wherein the outgoing internet protocol message includes one or more of an audio signal, a video signal, and a musical instrument digital interface signal, and wherein the conference bridge establishes a voice over internet protocol call between the first device, a second device, and a mix box external to the conference bridge;
  receive an incoming internet protocol message from the conference bridge, wherein the incoming internet protocol message comprises a mixed audio signal produced by the conference bridge from the outgoing internet protocol message and one or more second outgoing internet protocol messages received by the conference bridge from the second device, wherein the mix box sets a mixing level for each audio signal used to produce the mixed audio signal;
 a processor to process the incoming internet protocol message to generate an output; and
 an output port to receive the output produced by the processor.

2. The system of claim 1, wherein the output port includes a musical instrument digital interface output port to receive a first musical instrument digital interface signal from the processor and to output the first musical instrument digital interface signal.

3. The system of claim 1, wherein the output port comprises a video output port configured to be coupled to a display device.

4. The system of claim 1, wherein the incoming internet protocol message includes a mixed video signal.

5. The system of claim 4, wherein the mixed video signal is associated with a conductor and one or more performers, and wherein the mixed video signal represents a display of the conductor surrounded by pictures of the one or more performers and a picture of a performer associated with the first device.

6. The system of claim 1, wherein the processor generates the outgoing internet protocol internet protocol message from input received via one or more input ports.

7. The system of claim 6, wherein the one or more input ports comprise at least one musical instrument digital interface port.

8. The system of claim 1, further comprising a through-network chaining port in communication with the processor.

9. The system of claim 8, further comprising a third device coupled to the through-network chaining port to expand a number of input ports supported at a location associated with the first device.

10. The system of claim 1, wherein the processor and the network interface are integrated within a set-top box associated with an internet protocol television service.

11. The system of claim 1, wherein the processor and the network interface are integrated within a computer that is coupled to an Internet service.

12. The system of claim 1, wherein the conference bridge includes an audio mixer, a video mixer, and a musical instrument digital interface mixer.

13. A system comprising:
 a voice over internet protocol conference bridge to:
  receive input internet protocol messages from two or more devices coupled to the voice over internet protocol conference bridge as participants of a voice over internet protocol call, wherein each internet protocol message includes one or more of an audio signal, a video signal, and a musical instrument digital interface signal;
  send output internet protocol messages to the two or more devices, wherein the output internet protocol messages include a mixed audio signal;
 an audio mixer coupled to the voice over internet protocol conference bridge to generate the mixed audio signal, wherein the mixed audio signal includes one or more of the signals received from the two or more devices; and
 mix controls coupled to the audio mixer, wherein the mix controls enable user input that controls a level of each signal used by the audio mixer to generate the mixed audio signal.

14. The system of claim 13, further comprising a video mixer coupled to the voice over internet protocol conference bridge, wherein the video mixer is configured to add a mixed video message to the output internet protocol message when the input internet protocol messages from the two or more devices include a video signal.

15. The system of claim 13, further comprising a recorder coupled to the voice over internet protocol conference bridge to record separate tracks of audio from the input internet protocol messages.

16. The system of claim 15, wherein the recorder is configured to record the mixed audio signal, a mixed video signal, and a mixed musical instrument digital interface signal.

17. The system of claim 13, wherein the voice over internet protocol conference bridge is operable to automatically assign a port to each of the plurality of incoming voice over internet protocol calls.

18. The system of claim 13, wherein the voice over internet protocol conference bridge is responsive to a port number requested via one of the plurality of incoming voice over internet protocol calls.

19. A computer-readable storage device that stores processor-executable instructions that, when executed by a processor, cause the processor to:
   send an outgoing internet protocol message to a conference bridge, wherein the outgoing internet protocol message includes one or more of an audio signal, a video signal, and a musical instrument digital interface signal, and wherein the conference bridge establishes a voice over internet protocol call between the first device, at least one second device, and a mix box external to the conference bridge;
   receive an incoming internet protocol message from the conference bridge, wherein the incoming internet protocol message comprises a mixed audio signal produced by the conference bridge from the outgoing internet protocol message and one or more second outgoing internet protocol messages received by the conference bridge from the at least one second device, wherein the mix box sets a mixing level for each audio signal used to produce the mixed audio signal;
   process the incoming internet protocol message to generate an output; and
   send portions of the output to one or more output ports.

20. The computer-readable storage device of claim 19, wherein the output includes a musical instrument digital interface signal, and wherein the one or more output ports include a musical instrument digital interface output port that receives the musical instrument digital interface signal.

* * * * *